(12) United States Patent
Schlecht

(10) Patent No.: US 10,310,484 B2
(45) Date of Patent: Jun. 4, 2019

(54) DEVICE AND METHOD FOR FAILSAFE MONITORING OF A MOVING MACHINE PART

(71) Applicant: Pilz GmbH & Co. KG, Ostfildern (DE)

(72) Inventor: Michael Schlecht, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 18 days.

(21) Appl. No.: 15/336,050

(22) Filed: Oct. 27, 2016

(65) Prior Publication Data

US 2017/0045878 A1   Feb. 16, 2017

Related U.S. Application Data

(63) Continuation of application No. PCT/EP2015/059532, filed on Apr. 30, 2015.

(30) Foreign Application Priority Data

May 2, 2014   (DE) .......................... 10 2014 106 166

(51) Int. Cl.
*G05B 19/406* (2006.01)
*H02H 7/08* (2006.01)
(Continued)

(52) U.S. Cl.
CPC ............ *G05B 19/406* (2013.01); *G05B 9/02* (2013.01); *G05B 23/0291* (2013.01);
(Continued)

(58) Field of Classification Search
CPC ........ G05B 9/02; G05B 9/03; G05B 19/4063; G05B 2219/34483; G05B 2219/34484;
(Continued)

(56) References Cited

U.S. PATENT DOCUMENTS 5,047,752 A * 9/1991 Schorn .................... F16P 3/141
  192/129 A
6,276,916 B1 * 8/2001 Schad ..................... B29C 45/84
  425/136

(Continued)

FOREIGN PATENT DOCUMENTS

DE          38 37 218 A1    5/1990
DE   10 2006 046 286 A1    6/2007
(Continued)

OTHER PUBLICATIONS

English language translation of International Preliminary Report on Patentability for PCT/EP2015/059532, dated Nov. 8, 2006; 10 pp.

(Continued)

*Primary Examiner* — Crystal J Barnes-Bullock
(74) *Attorney, Agent, or Firm* — Harness, Dickey & Pierce, P.L.C.

(57) ABSTRACT

A device for failsafe monitoring a number of passes of a moving machine part through a defined movement region comprising an input for receiving an encoder signal, which represents a motion value of the moving machine part. The device further comprises a failsafe evaluation unit for providing a failsafe shutdown signal as a function of the number of passes of the moving machine part through the defined movement region. The failsafe evaluation unit is configured to determine the number of passes of the moving machine part through the defined movement region from the motion value.

20 Claims, 3 Drawing Sheets

(51) Int. Cl.
*G05B 9/02* (2006.01)
*G05B 23/02* (2006.01)

(52) U.S. Cl.
CPC . *H02H 7/0844* (2013.01); *G05B 2219/24008* (2013.01); *G05B 2219/24182* (2013.01); *G05B 2219/50177* (2013.01); *G05B 2219/50198* (2013.01); *Y02P 90/265* (2015.11)

(58) Field of Classification Search
CPC ... F16P 3/141; F16P 3/142; F16P 3/16; G01D 5/24461; H02H 7/0844; B29C 45/84
See application file for complete search history.

(56) References Cited

U.S. PATENT DOCUMENTS

| | | | | |
|---|---|---|---|---|
| 7,911,333 B2 * | 3/2011 | Bussert | ............... | G05B 9/03 340/507 |
| 9,228,697 B2 * | 1/2016 | Schneider | ............... | F16P 3/142 |
| 9,343,896 B2 * | 5/2016 | Laturner | ............... | G05B 9/02 |
| 2012/0268107 A1 * | 10/2012 | Laturner | ............... | G05B 9/02 324/161 |
| 2013/0241316 A1 | 9/2013 | Morikawa et al. | | |

FOREIGN PATENT DOCUMENTS

| | | |
|---|---|---|
| DE | 10 2007 063 099 A1 | 7/2009 |
| EP | 1 736 842 A2 | 6/2006 |
| JP | 2013511757 A | 4/2013 |
| JP | 2013191130 A | 9/2013 |

OTHER PUBLICATIONS

PNOZ s30—Monitoring of rotational speed and speed range; Pilz GmbH & Co. KG; Dec. 15, 2011; 16 pp.
EN 954-1—Safety-related parts of control systems; Part 1: General principles for design; Mar. 1997; 33 pp.
CEI IEC 61508-2; International Standard; Functional safety of electrical/electronic/programmable electronic safety-related systems—Part 2: Requirements for electrical/electronic/programmable electronic safety-related systems; 152 pp.
EN ISO 13849-1; Safety of machinery—Safety-related parts of control systems—Part 1: General principles for design; Nov. 2006.
International Search Report for PCT/EP2015/059532; dated Aug. 19, 2015; 2 pp.
DIN EN ISO 12100-1; Safety of machinery—Basic concepts, general principles for design—Part 1: Basic terminology, methodology; Apr. 2004; 39 pp.
JOKAB Safety Innovations in safety: Das Sicherheitshandbuch (with English translation); Mar. 2009; 6 pp.
Japanese Examination Report (English translation included) for parallel Japanese Appl'n No. 2017-508763, dated Jan. 10, 2019; 6 pp.

* cited by examiner

DEVICE AND METHOD FOR FAILSAFE MONITORING OF A MOVING MACHINE PART

CROSS-REFERENCES TO RELATED APPLICATIONS

This application is a continuation of international patent application PCT/EP2015/059532, filed on Apr. 30, 2015 designating the U.S., which international patent application has been published in German language and claims priority from German patent application DE 10 2014 106 166.7, filed on May 2, 2014. The entire contents of these priority applications are incorporated herein by reference.

BACKGROUND OF THE INVENTION

The present disclosure relates to a device and method for failsafe monitoring a number of passes of a moving machine part through a defined movement region.

The present disclosure relates in particular to the field of machine and facility safety. Generally, operating modern machines and facilities comes along with an extensive safety concept, no matter if it relates to machine tools such as processing centers, presses, assembly facilities or to robots. However, many risks to persons, products, and processes arise from machines and facilities as a result of the rapid, high degree of automation, which are hardly recognizable at first glance. Therefore, there is a number of guidelines, standards, and laws, which define specific safety requirements, which are to be considered in the implementation of technical facilities.

Relevant standards are, inter alia, EN ISO 12100:2010 as the central standard for machine safety, EN ISO 13849-1 (successor of EN 954-1) as the central standard for the design of safety-oriented controllers in the field of "machine safety" and IEC 61508, which defines requirements for safety systems of a facility independently of the application. The present disclosure relates in particular to devices which, with regard to functional safety, achieve a safety integrity level (SIL) classification of at least SIL-2 or a performance level greater than $PL_c$, wherein the performance level, according to EN ISO 13849-1, defines the probability of a dangerous failure per hour.

Different safety aspects have to be taken into account for technical facilities that operate automatically. On the one hand, it has to be ensured that no unauthorized access or entry by persons or products into an assigned region of action of the machine takes place, or that the moving machine part is safely transferred into a safe state in such a case. Furthermore, it has to be ensured that the moving machine part does not itself leave the assigned region of action, for example, in that the moving machine part passes beyond end points of its movement axes or breaks out of a predefined mechanical delimitation in another manner. In this way, on the one hand, parts of the technical facilities or the moving machine part itself can be entirely or partially damaged or destroyed, whereby time-consuming and costly repairs could become necessary. On the other hand, a moving machine part exiting from its region of action can represent additional hazards to persons and products, which are not detected by the above-mentioned access monitoring.

The monitoring of a technical facility which has moving machine parts, from which a risk can originate, therefore regularly requires two monitoring units, which are often separate from one another. On the one hand, spatial securing takes place to restrict the access by persons or to monitor passage or pass-through regions, wherein walls, stable protective gratings, or electromechanical or optoelectronic safety devices are regularly used. On the other hand, a moving machine part itself has to be monitored as to whether it is located within its region of action. This is generally carried out using position switches, light grids, or camera-based safety devices, with which the boundaries of the region of action can be monitored, in order to register an exit from the region of action. Alternatively, the respective position of the moving machine part may be directly determined in a failsafe manner.

In large facilities, for example, production lines in automobile manufacturing, in which a variety of technical facilities having moving machine parts have to be monitored, monitoring and the associated safety concept can become very complex and costly. This is in particular because safety-relevant, failsafe monitoring is often implemented by redundant monitoring, whereby the number of safety devices used, in particular the number of sensors and actuators, regularly doubles. Generally, it is desirable to reduce the number of safety devices to a minimum and at the same time ensure safety according to the standards.

In addition, the monitoring of a region of action of a technical facility is becoming more and more complex as a result of increasingly intelligent machines, for example, computer-controlled, automatically operating robots, because the region of action thereof can often no longer be defined using clear boundaries. For complex segmentation of the region of action, in which also subregions have to be monitored, the number of required sensors can increase rapidly, in particular if every physical and any freely-defined boundary has to be redundantly monitored due to fail-safety requirements, as mentioned above.

In addition, in some fields of application, a use of simple position sensors at the boundaries of the region of action is not possible at all, for example, if a critical state first occurs after a movement region has been passed through multiple times. In particular in the case of circular movements about an axis, in which multiple complete revolutions are enabled, but a maximum number is predefined, monitoring using simple position sensors is not possible or is only to be managed using additional evaluation units, which in turn also have to be failsafe per se.

SUMMARY OF THE INVENTION

It is an object to provide a device and a corresponding method which enable failsafe monitoring of a moving machine part of a technical facility which avoid the above-mentioned disadvantages. In particular, it is an object to provide a device and a corresponding method which enable failsafe monitoring of a moving machine part of a technical facility in a simpler manner. It is further an object to provide such a device in a more cost-effective and flexible manner.

According to an aspect of the present disclosure there is provided a device for failsafe monitoring of a number of passes of a moving machine part through a defined movement region comprising an input for receiving an encoder signal, which represents a motion value of the moving machine part, and a failsafe evaluation unit for providing a failsafe shutdown signal as a function of the number of passes of the moving machine part through the defined movement region, wherein the evaluation unit is configured to determine the number of passes of the moving machine part through the defined movement region from the motion value.

According to a further aspect of the present disclosure there is provided a method for failsafe monitoring of a number of passes of a moving machine part through a defined movement region, the method comprising:

receiving an encoder signal, which represents a motion value of the moving machine part, at an input, and providing a failsafe shutdown signal as a function of the number of passes of the moving machine part through the defined movement region by a failsafe evaluation unit, wherein the failsafe evaluation unit is configured to determine the number of passes of the moving machine part through the defined movement region from the motion value.

The novel device and the novel method are therefore based on the concept of carrying out the monitoring of a movement region of a moving machine part on the basis of position monitoring of the moving machine part and, at least for the case in which the moving machine part leaves its defined, permissible region of action, generating a failsafe, preferably redundant shutdown signal, with which a technical facility can be safely shut down if necessary. Advantageously, the novel device and the novel method can do without or with a reduced number of additional sensors completely monitor the boundaries of a movement region in a failsafe manner. The monitoring of a movement region is thereby simplified and costs for additional sensors, actuators, and the wiring thereof can be saved.

Furthermore, the novel device and the novel method enable the movement regions to be monitored to be selected flexibly. The regions therefore do not have to be determined by physical boundaries, but rather can be defined from the absolute or relative position of the moving machine part. For example, a movement region and its boundaries can be defined by a relative position specification with respect to a fixed resting point. The novel device can therefore be adapted rapidly and flexibly to specific conditions, without having to carry out any structural modification or changes on the sensor arrangements.

The flexible selection of the movement region furthermore has the advantage that multiple passes of the moving machine part through a physical movement region can be taken into account, for example, in that a movement region is defined which goes beyond the physical movement region. On the basis of the example of a circular movement, the movement region can therefore be determined by a specific number of revolutions. In this case, the speed of the corresponding drive would be the relevant motion value, from which the number of the revolutions may be determined directly or from a transmission ratio of the drive. The encoder signal can originate for this purpose, for example, from a safety rotary encoder, so that the encoder signal itself is failsafe. Alternatively, however, a redundant detection of the motion value at the input of the device is also possible. The movement can advantageously be detected independently of the movement or rotational direction. The movement can be a rotational movement or a translational movement.

The above procedure can therefore also be used in the case of lateral movements. The physical relationship required for this purpose between acceleration, velocity, and distance covered is well known. Thus, the velocity of a moving facility part may be calculated from the determined acceleration, by integrating the determined acceleration over time. Similarly, the distance covered can be determined by integration over the velocity. To obtain the actual values of the velocity or distance, however, the velocity and the position of the moving facility part have to be known at the beginning of the integration time. This is not a problem in the case of an automatically operating, stationary facility, however, since generally a defined rest state exists at least after the activation of the facility or is assumed in an initialization process.

In addition, diverse encoder signals, which represent a motion value, are advantageously already available in many technical facilities having moving machine parts and can be reused by the novel device. In this manner, existing sensors can be used for providing the encoder signal, whereby spatial monitoring can be implemented even more cost-effectively. Reuse may also be possible with respect to the safety concept, in that the novel device can advantageously be combined with other sensors, for example, sensors for spatial securing, or can replace them in the reverse case.

In addition, the novel device has the advantage that it can be used substantially independently of the respective facility type and the safety concept used and can therefore be used for a variety of different facilities.

Overall, the present disclosure offers a cost-effective and flexible possibility for failsafe monitoring of a movement region of a moving machine part. The above-mentioned object is therefore achieved in full.

In a preferred refinement, the failsafe evaluation unit is furthermore configured to determine a first and a second moving direction of the moving machine part in a failsafe manner on the basis of the motion value.

In this refinement, in addition to the number of passes of a moving machine part, a moving direction of the moving machine part can also be determined in a failsafe manner. This has the advantage that the defined movement region can be defined as a function of the relative position of the machine part and the moving direction. Failsafe in this context means that a faulty determination of the moving direction can be managed, i.e., the device is configured such that in spite of a faulty detection of the moving direction, the failsafe shutdown signal is provided. The moving direction can be in particular a rotational direction.

In a further refinement, the device further comprises a counter, in which the number of passes is storable, wherein the counter is increased by a first defined absolute value when the moving machine part has completely passed through the defined movement region in a first moving direction and is reduced by a second defined absolute value when the moving machine part has completely passed through the defined movement region in a second moving direction.

In this refinement, the movement region is defined by a first and a second boundary, wherein the counter is increased upon each passage through the movement region in a fixed direction and the counter is decreased by a specific absolute value in the opposite direction. The counter therefore provides information about the relative position within the movement region. Thereby, a zero point can be established, for example, the rest position of the moving machine part, wherein the counter specifies the deviation from this rest point in absolute value and the sign indicates the respective direction. Rotational movements may be monitored particularly simply via the counter, wherein the defined movement region can also include multiple revolutions taking into account forward and backward running.

In a further refinement, the device comprises a memory, in which at least one value, which represents a boundary of the defined movement region, is storable.

In this refinement, the boundaries can advantageously be manually changed by the user. The device may thus be adapted particularly flexibly to the respective conditions. In order to change the monitored region, the parameters for the boundaries of the movement region merely have to be adapted in the memory. Thereby, in particular movement regions which are not physically bounded can be defined and monitored. The boundaries can be represented by different values, for example, by absolute and/or relative position specifications or by rotational angles in the case of a circular movement. The boundaries of the movement region are advantageously specified with respect to a rest position of the moving machine part, wherein a value for the rest position is also variably storable in the memory.

In a further refinement, the evaluation unit is configured to provide an output signal, which represents the first or second moving direction.

In this refinement, an additional output signal can be provided, which provides failsafe information about the respective moving direction. Such a signal can advantageously be analyzed by a higher-level controller and integrated into the overall safety concept. Thereby, other safety devices can optionally be supplemented and/or replaced.

In a further refinement, the evaluation unit is configured to provide a warning signal if the number of passes of the moving machine part through the defined movement region exceeds a defined value.

In this refinement, a warning signal can additionally be provided by the novel device if a specific number of passes has occurred. Such a warning signal can be used by a controller, for example, to engage in a corrective manner before the device provides the shutdown signal to shut down the facility. Thereby, unnecessary downtimes can be prevented, which are induced by avoidable shutdown procedures.

In a further refinement, the evaluation unit provides the shutdown signal upon exceeding a first defined value of the motion value.

In this refinement, in addition to monitoring the movement region, the motion value per se can be monitored. Therefore the device can advantageously be used also for failsafe speed monitoring and can optionally entirely or partially replace additional sensors.

In a further refinement, the evaluation unit is configured to provide a release signal if the motion value falls below a second defined value or represents a stop.

In this refinement, a further signal can be provided by the device, as a function of which, for example, the access to a facility can be controlled. In particular in the case of run-down machines which also execute a movement after the supply voltage is shut off, the access to the machine can still be limited with the aid of the release signal until no risk originates from the machine to be monitored. Thereby, further safety measures can be handled by the device.

In a further refinement, the device comprises a failsafe signal encoder for providing the encoder signal having a first and a second measurement channel.

The connection of a failsafe, preferably redundant evaluation unit to a failsafe signal encoder enables complete and redundant monitoring without additional components. Such a combination is therefore particularly advantageous and cost-effective in relation to methods in which separate units are required for detecting the redundant input variables.

The failsafe signal encoder is particularly preferably a rotary encoder having an optical and a magnetic sampling unit on a driving shaft.

An optical and a magnetic sampling unit particularly advantageously enable two full-featured measurement channels to be formed, which operate independently of one another. In addition to redundancy, the safety criterion of diversity can also be implemented by the two measurement channels in this manner. Both measurement systems preferably have a synchronous serial interface (SSI), which can transfer the same data format. Thereby, the evaluation unit can uniformly analyze both channels. Alternatively, rotary encoders can also be used which only have optical sampling units or only magnetic sampling units, respectively.

In a further refinement, the device comprises a first and a second switching element, wherein the shutdown signal is provided as a function of the switch position of the first and the second switching element.

A redundant and therefore failsafe shutdown signal may be generated particularly well by two switching elements and a continuous redundancy from the sensor inputs up to the actuators may be ensured. An operating voltage is advantageously led via the switching elements, the absence of which at the outputs results indirectly or directly in the shutdown of a facility to be monitored.

In a further refinement, the failsafe evaluation unit is configured redundant with two channels.

By using a two-channel, redundant evaluation unit, the requirements of a failsafe evaluation unit can be ensured particularly well. It can thus be ensured, if a two-channel evaluation unit is used, that a facility to be monitored can still be shut down even in the event of failure of one channel.

In a further refinement, the evaluation unit comprises a first and a second processing unit each generating an output signal, which represents the shutdown signal, wherein the first and the second processing unit are configured to mutually monitor one another.

A redundant and therefore failsafe evaluation unit can be implemented particularly simply and reliably by this refinement. Due to the mutual monitoring, it not only can be ensured that in the event of a fault in one channel, the facility is reliably shut down, but rather that a faulty channel can also be reliably recognized. Monitoring preferably also comprises periodic testing of the individual channels by the evaluation unit and/or a higher-level controller.

It is obvious that the above-mentioned features and the features to be explained hereafter are usable not only in the respective specified combination but rather also in other combinations or alone, without leaving the scope of the present disclosure.

DESCRIPTION OF PREFERRED
EMBODIMENTS

Figure 1:
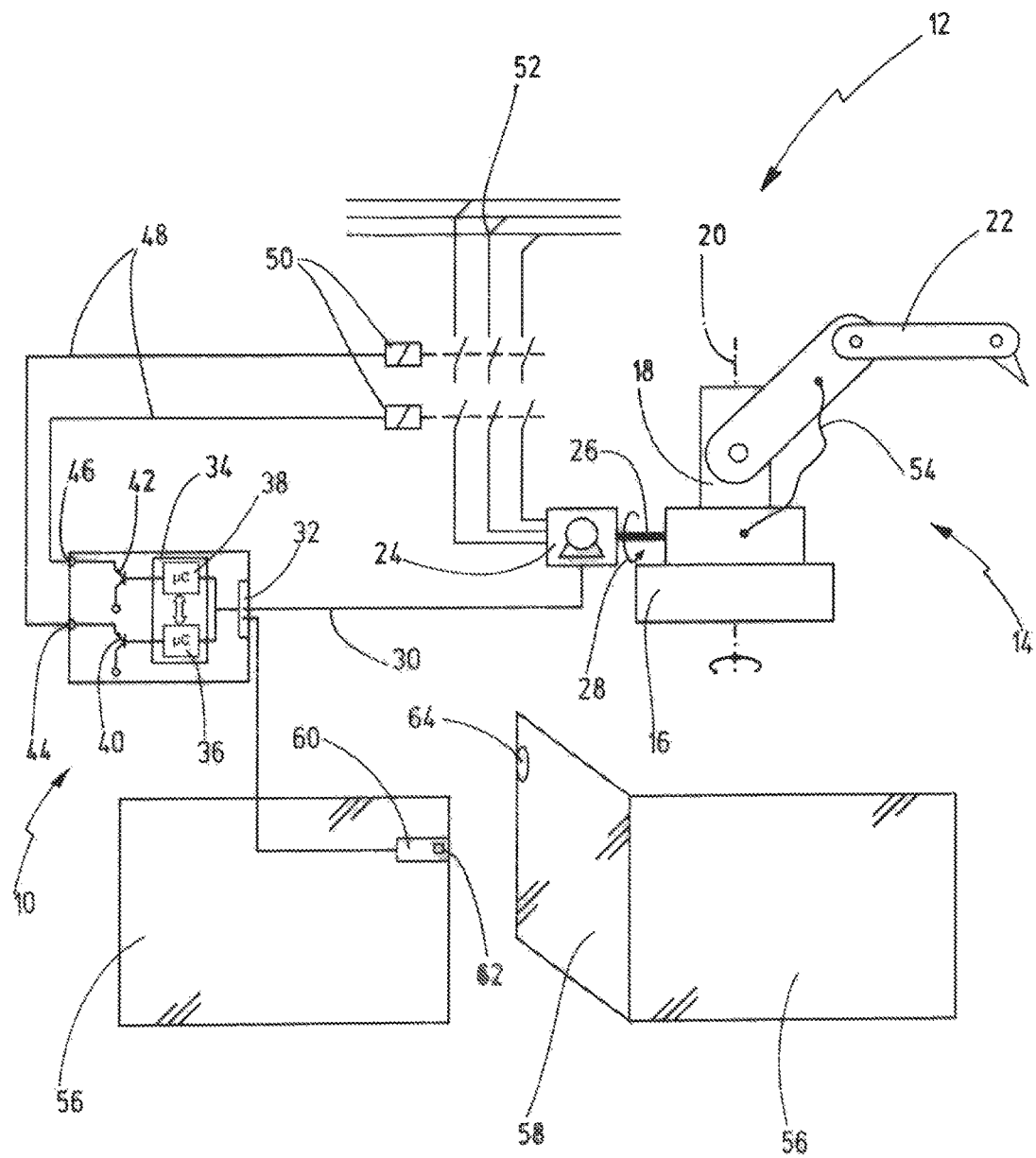
FIG. 1 shows a simplified, schematic illustration of an exemplary embodiment of the novel disclosure.

In FIG. 1, a preferred exemplary embodiment of the novel device is identified in its entirety with the reference numeral 10.

The device is used here to monitor a technical facility 12, which is indicated by a robot 14. The robot 14 is arranged here on a fixed base 16, on which a moving machine part 18 is placed, which can rotate here completely about its longitudinal axis 20. A robot arm 22, which is movable in space by the rotational movement of the moving machine part 18, is arranged on the moving machine part 18. The region of action to be secured of the technical facility therefore results here from the region of action of the robot arm 22 plus the area occupied by a moved load.

Two safety measures are applied in the illustrated case to secure the technical facility 12. On the one hand, it is monitored that no unauthorized access into the region of action to be secured occurs and, on the other hand, it is ensured that the technical facility 12 itself acts within its predefined parameters and does not leave them. For the latter case, it has to be monitored in particular whether the robot arm 22 and, connected thereto, the moving machine part 18 remains within its assigned movement region. As will be explained in greater detail hereafter, in this preferred exemplary embodiment of the novel disclosure, both safety measures are performed by the device 10.

The robot 14 is driven here by an electric drive 24, which is coupled via a shaft 26 to the moving machine part 18. The coupling of the shaft 26 to the moving machine part is performed, for example, via a transmission (not shown here) having a fixed transmission ratio, so that the movement of the moving machine part 18 is proportional to a speed 28 of the electric drive 24. The speed 28 of the drive is detected here by a signal encoder and transmitted as an encoder signal via the line 30 to the device 10. Various ways of detecting the speed 28 are possible, preferably, however, a secure rotary encoder (not shown in greater detail here) is used, the sensors of which are coupled to the shaft 26 and which is configured to determine the speed of the shaft 26 in a failsafe manner and to generate a corresponding encoder signal. The speed 28 represents here only one possibility of a motion value. Alternatively or additionally, the acceleration of the shaft or an absolute distance can be determined by corresponding sensors. The device is therefore not restricted to a specific motion value, but rather can preferably use various motion values for analysis, for example, to test the plausibility of an analysis result on the basis of various individual measurements.

The line 30 is furthermore connected to an input 32 of the device 10, via which the encoder signal is relayed to the failsafe evaluation unit 34. The failsafe design of the evaluation unit 34 is indicated here by two processing units 36, 38, which are separate from one another, and which preferably can mutually monitor one another. The device 10 is therefore designed as redundant with two channels. The failsafe evaluation unit 34 determines, as will be explained in greater detail hereafter, the respective passes through a defined movement region of the robot 14 on the basis of the motion value or variables transmitted using the encoder signal. The movement region is defined here by one complete revolution of the moving machine part 18, wherein the robot 14 can pass through this movement region multiple times, i.e., the robot can rotate multiple times about its own axis 20. As is explained in greater detail with reference to FIGS. 3a and 3b, the defined movement region is not restricted to circular movements, but rather can also comprise lateral movements.

In the preferred exemplary embodiment illustrated here, the failsafe evaluation unit 34 determines, on the basis of the speed 28 of the electric drive 24, the actually performed number of rotations of the moving machine part 18 about its own axis 20. In other exemplary embodiments, the movement of the moving machine part 18 is alternatively or additionally determined by other motion values. In this case, the motion value does not have to be determined directly at the drive 24, but rather can also be determined by acceleration sensors on the moving machine part 18 itself, for example. Various motion values are particularly preferably detected and analyzed to enable diverse monitoring. The movement can preferably also be detected in relation to a determined fixed point, for example, a rest position of the robot 14. In this manner, the analysis can be based on relative values, whereby variables of various sensors can be more easily compared and/or combined.

As a function of the analysis, the failsafe evaluation unit 34 provides a failsafe shutdown signal if a number of passes through the defined movement region exceeds a defined threshold value. The threshold value can also assume the value "1" in this case, so that the failsafe shutdown signal is already generated after a single pass through the defined movement region. Failsafe also means in this context that it can always be ensured using the shutdown signal that a facility to be monitored shuts down, even if parts of the safety function become nonfunctional. A redundant shutdown signal is therefore preferably also used in this case, as indicated here by the two switching elements 40, 42. Via the switching elements 40, 42, a supply voltage (not shown in greater detail here) is applied to the outlets 44, 46, which control the contactors 50 connected via the lines 48 in this exemplary embodiment. The contacts of the contactors 50 are in turn in series in a power supply 52 of the electric drive 24 in a known manner. The electric drive 24 is only powered and operationally ready when the contactors have been energized and therefore retracted. As a result, at least one of the contactors 50 drops when one of the switching elements 40, 42 is opened, whereby the robot 14 is put in a safe state as a result of the interrupted power supply 52.

In the given example this may be the case when the moving machine part 18 has carried out a fixed number of revolutions about its own axis 20 and has therefore exceeded the defined threshold value. A threshold value could be given in this case by a physical restriction of the movement possibility of the moving machine part, which does not result directly from the type of the drive. For this purpose, for example, a compressed air line 54 is indicated here between the base 16 and the robot arm 22, which can only wind around the robot for a specific number of revolutions. The device enables the robot 14 to be securely shut down as soon as the defined number of revolutions has occurred. It is to be noted here that the monitoring is not restricted to the exemplary embodiment shown, but rather can be used for any type of monitoring of a number of passes through a movement region, in which a motion value can be used to determine the absolute or relative location.

The exemplary embodiment according to FIG. 1 may also entirely or partially carry out further safety measures in addition to monitoring the number of the passes through a defined movement region. Thus, a safety fence 56 having a monitored door 58 is provided here, for example, to secure the unauthorized access to the region of action of the robot 14. The door 58 has a safety device 60 having a sensor 62 and an actuator 64, wherein the safety device 60 only generates a release signal 66 when the door 58 is properly closed. The release signal 66 of the safety device 60 is received at the input 34 of the device 10 and preferably processed as a binary signal by the evaluation unit 34, which activates the outputs 44, 46 in the above-described manner as a function of the release signal 66. In one particularly preferred exemplary embodiment, in the reverse case, the device 10 can instruct the safety door switch 44 to lock the safety door until a corresponding secure state of the technical facility 12 is achieved. This can be achieved, for example, when the drive is stopped or the speed has fallen below a defined value. Additionally or alternatively, the safety device 60 can also have an interlock, so that the door can only be opened if a corresponding release signal from the device 10 is present.

Therefore, the device can generally also be used for monitoring the motion value itself. For example, a secure shutdown of the facility can also be performed by the novel device when the drive 24 has exceeded a defined maximum speed. Overall, the novel device may therefore be integrated easily and flexibly into existing security concepts and/or previous safety devices can preferably be supplemented or replaced by the novel device.

A particularly preferred exemplary embodiment of the novel device 10 is explained hereinafter with reference to FIG. 2. Thereby, identical reference signs identify identical parts as in FIG. 1.

The device 10 is structurally divided here into three regions I, II, III. A voltage supply 68 for the internal components of the novel device 10 is arranged in the first region I. The logic units and the inputs are combined in the second region II. The third region III comprises the safety outputs 44, 46 with the associated switching elements 40, 42. In general, the interfaces to the outside are indicated here by circles on the housing 70 of the novel device, wherein these are preferably spring forced terminals. The input 32 is configured here as an RJ45 interface 72 and is suitable for accommodating a multicore patch cable.

An encoder signal is provided in this exemplary embodiment by a secure signal encoder. The encoder is indicated here by a dedicated measurement system 74, which is arranged on a drive of a moving machine part (not shown here) and determines a motion value of the moving machine part in a failsafe manner. The measurement system 74 is preferably a redundant, two-channel system, for example, having an optical and a magnetic sampling unit, which are arranged on a drive shaft and which each provide a signal representative of the movement of the moving machine part. Alternatively or additionally, other motion values can be detected by the measurement system 74, for example, by acceleration sensors on the moving machine part. The measured signals, which together represent the encoder signal, are transmitted in this exemplary embodiment independently of one another via one core each of a six-core patch cable at the input 32.

Evaluating the encoder signal is performed by the failsafe evaluation unit 34, which is also designed redundantly with two channels in this exemplary embodiment. For this purpose, the evaluation unit 34 has a first and a second processing unit 36, 38, for example, in the form of an FPGA, ASIC, or other type of microcontroller. In particularly preferred exemplary embodiments, the failsafe evaluation unit 34 is additionally not only designed as redundant, but rather also as diverse, for example, by using functionally equivalent but structurally different microcontrollers from different producers, as indicated here by the inscription in italics on the second processing unit 38. This design enables system-related manufacturing faults to be precluded.

Two switching elements 40, 42, which each switch one signal path 76, 78 of the secure output 44, 46, are activated by the failsafe evaluation unit 34 based on the encoder signal. The contacts of the switching elements, via which the signal paths are led, are preferably each an opener contact and a closer contact, which are positively guided in relation to one another. A supply voltage for external contactors can be led via the signal paths 76, 78, as already explained with reference to FIG. 1, wherein the contactors drop as soon as the associated signal path 76, 78 is opened.

As was already described above with reference to FIG. 1, the failsafe evaluation unit 34 can determine the number of passes of the moving machine part 18 through a defined movement region on the basis of the motion value transmitted with the encoder signal and can provide a redundant shutdown signal via the outputs 44, 46. In addition, in this preferred embodiment, the failsafe evaluation unit 34 is further configured to switch the outputs 44, 46 if the motion value itself exceeds an established threshold value. Thus, using the exemplary embodiment shown here, the passes of a moving machine part through a defined movement region can be determined and at the same time a limiting or highest speed of the drive can be monitored.

The device can additionally preferably be freely parameterized, for example, in that values for the defined movement region or the threshold values are stored in a memory 80. Thereby, the device can be flexibly adapted to the respective task. The memory 80 is particularly preferably a removable memory, for example, a chip card or memory card, so that a configuration can be prepared and altered in a simple manner on a separate appliance and transferred to the device.

The device 10 can advantageously perform further safety-oriented tasks in addition to the shutdown function. For this purpose, the device 10 has further outputs 82, via which the shutdown signal or other types of warning signals can be provided. In contrast to the outputs 44, 46, these are preferably small-sized semiconductor outputs. Additional warning signals can be provided via the semiconductor outputs, for example, if additional movement regions are defined, exceeding these regions can trigger a corresponding warning signal. The parameterization of the additional movement regions and the threshold values for the warning signals can also be stored in this case in the memory 80. A higher-level controller 84 can be, for example, a programmable controller (PLC), which activates the facility on the basis of the warning signals, to forestall a final shutdown of the facility by the device.

Figure 2:
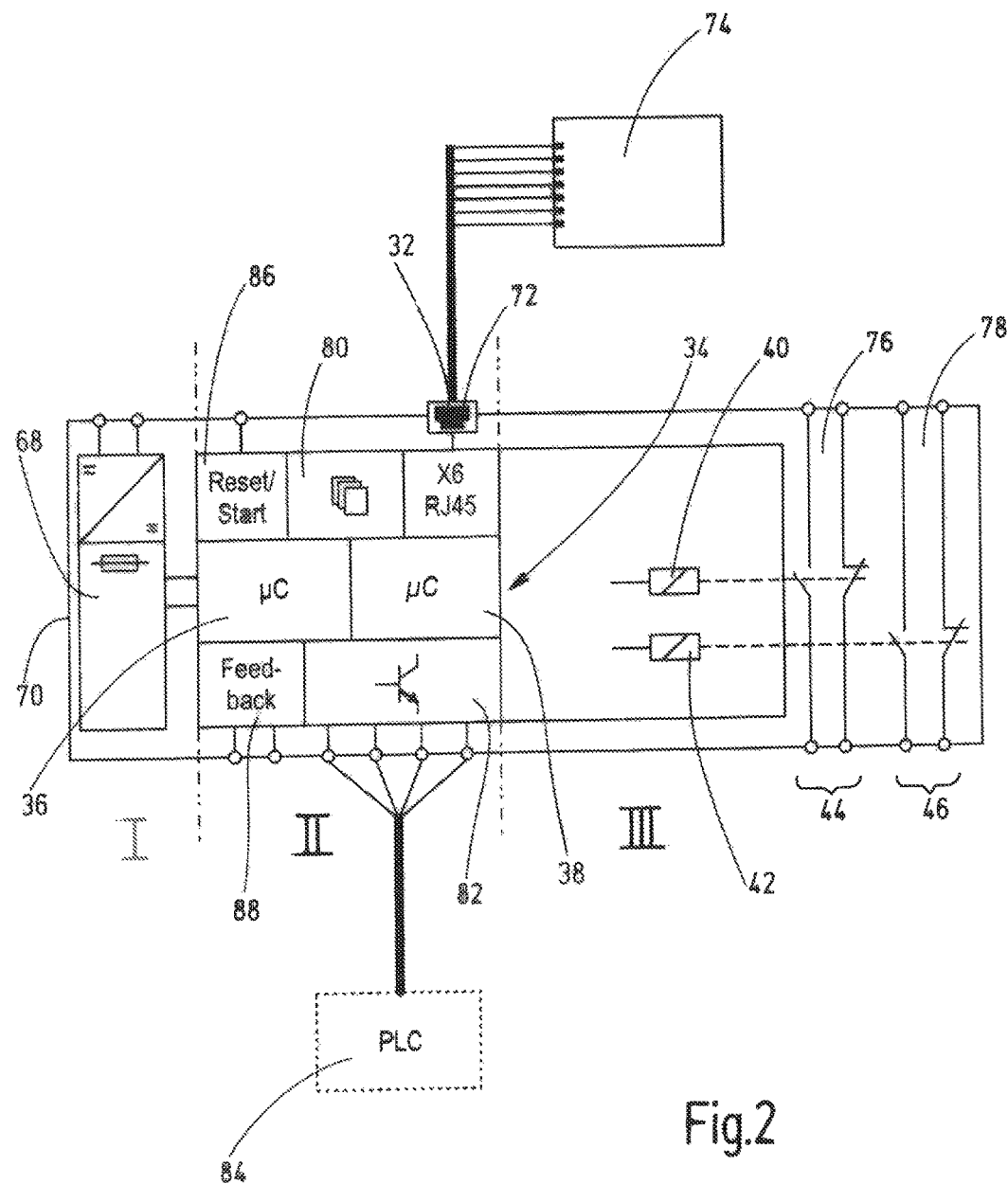
FIG. 2 shows a block diagram of a preferred exemplary embodiment of the novel disclosure.

Besides the additional outputs, in the preferred exemplary embodiment according to FIG. 2, additional inputs are also provided, for example, for a reset/start unit 86 and/or a feedback unit 88. A button (not shown here) is connectable to the reset/start unit 86, with which secure starting of the facility by a manual release can be enabled. It can be ensured by the manual release that renewed starting of the machine has to be confirmed by a person. The device 10 can therefore be reset via the reset/start unit, should a shutdown occur.

The switch position of the secure outputs 44, 46 and/or the contactors can preferably be fed back via the feedback unit 88, via which the device 10 can test its own functionality. In the preferred exemplary embodiments, the device continually tests its own functionality via the feedback unit 88.

The device is preferably arranged in a housing 70 and is preferably suitable for mounting on a standard rail. The housing can be installed in a control cabinet or can itself be designed for an international protection marking of at least IP54, preferably IP67.

Figure 3A:
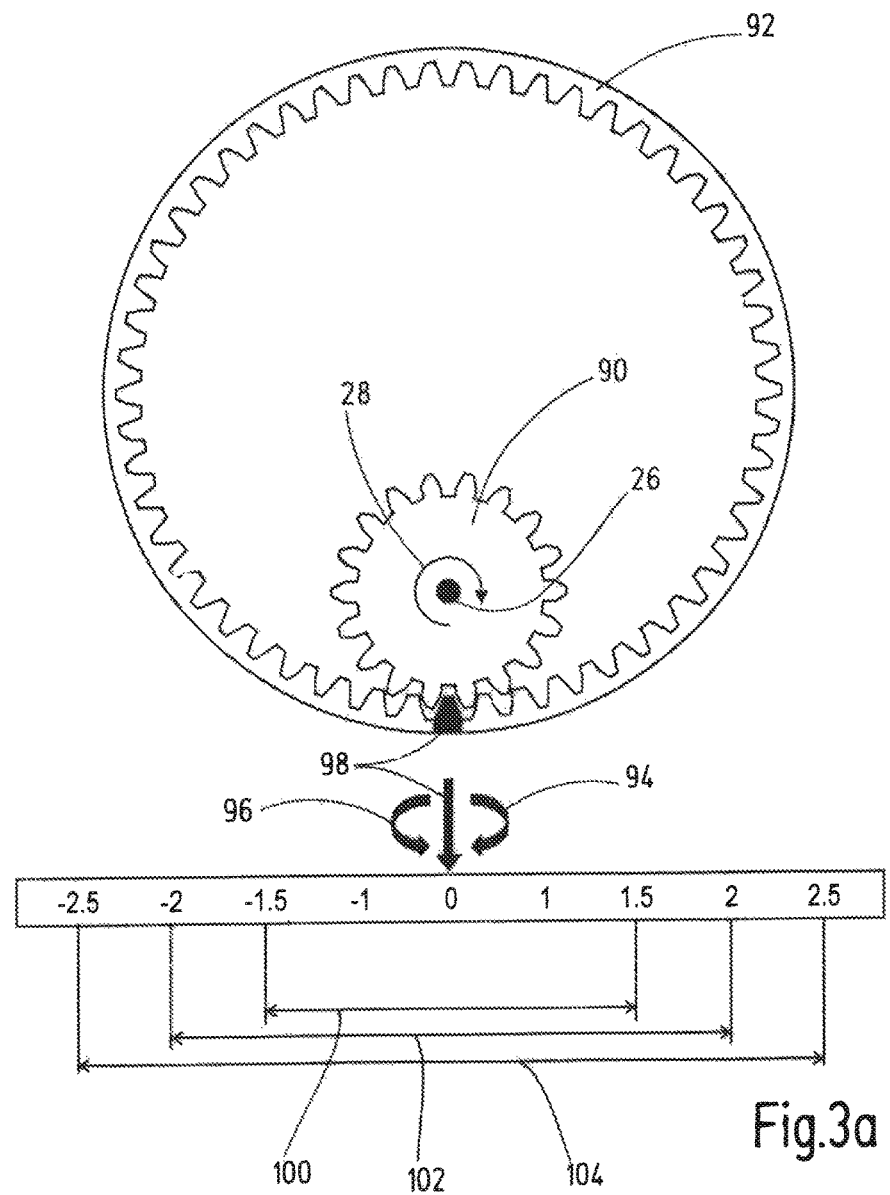
FIG. 3a shows an example of a movement region to be monitored of a moving machine part.
Figure 3B:
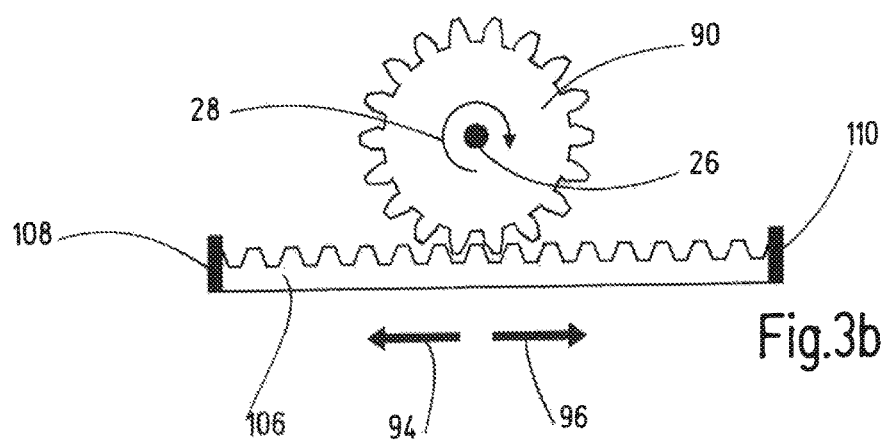
FIG. 3b shows a further example of a movement region to be monitored of a moving machine part.

Two movement regions to be monitored are explained by way of example hereafter with reference to FIGS. 3*a* and 3*b*, which can preferably be monitored using the novel device 10.

FIG. 3*a* shows a preferred exemplary embodiment for monitoring a circular movement. A moving machine part (not shown in greater detail) is driven here via a transmission having a spur gear 90 and an internally-toothed gearwheel 92. The spur gear 90 is connected to a driving shaft 26, which is itself coupled to a drive (not shown here). The driving shaft 26 transmits a speed 28 of the drive to the spur gear 90, which in turn drives the internally-toothed gearwheel 92 and, connected thereto, the moving machine part. The moving machine part is therefore rotated in proportion to the speed 28 in a ratio predefined by the transmission.

The movement region can be defined here by one complete revolution of the internally-toothed gearwheel 92. One passage through the defined movement region would therefore correspond to one complete revolution of the internally-toothed gearwheel 92. The required number of the revolutions of the driving shaft 26, which may in turn be ascertained from the speed, the rotational velocity, and/or the rotational acceleration in a way known per se, can in turn be determined via the transmission ratio of the transmission. Rotational acceleration, rotational velocity, and/or the speed can therefore all be motion values in the meaning of the present disclosure.

The number of passes through the defined movement region is additionally dependent on a moving direction of the drive. In the exemplary embodiment shown, the moving direction is determined by the rotational direction of the drive, by which the moving machine part may be moved in a first moving direction 94 and a second moving direction 96 opposite thereto through the defined movement region. In addition to the movement, the moving direction 94, 96 also has to be determined in a failsafe manner from the motion value by the novel device. The failsafe determined moving direction can preferably be provided as a further signal via a separate output of the device for further applications.

Because the defined movement region may be decisively determined by the motion value, movement regions can be defined in a simple manner, which cannot be captured directly in mechanical boundaries, for example, partial rotations. Therefore, using the device, these subregions can also be monitored in a failsafe manner and a safe shutdown can be ensured if a subregion is exceeded. Additional safety-relevant sensors or actuators are not required for this purpose.

Various regions are illustrated in a diagram with reference to FIG. 3a, wherein the integer specifications each represent the corresponding number of passes through the defined movement region. The number of passes is related here to a fixed point 98, which represents a rest position of the moving machine part, for example. Proceeding from this fixed point 98, a first and a second region 100, 102 are defined, wherein a warning is triggered in each case when the number of passes exceeds one of these regions. The warnings can preferably be provided as a separate signal via additional outputs to a higher-level controller. A third region 104 marks the shutdown region. If the moving machine part exceeds this region, a failsafe shutdown signal is provided by the device, based on which the drive of the moving machine part is reliably and securely stopped. The regions can preferably be freely parameterized, so that the device can be easily adapted to altered conditions.

The present disclosure is not restricted to the monitoring of circular movements, as shown in FIG. 3a. For example, the monitoring of a translational movement is indicated with reference to FIG. 3b. A spur gear 90, which is driven via a driving shaft 26, engages here in a toothed rack 106, which is coupled to a moving machine part (not shown here). The rotation of the spur gear 90 is therefore converted into a translation. As previously described on the basis of the circular movement, one or more defined movement regions can be defined within the physical boundaries 108, 110 of the toothed rack 106 and can be monitored in a failsafe manner by the novel device.

What is claimed is:

1. A device for failsafe monitoring a number of passes of a moving machine part through a defined movement region, comprising:
an input for receiving an encoder signal, which represents a motion value of the moving machine part, and
a failsafe evaluation unit for providing a failsafe shutdown signal as a function of the number of passes of the moving machine part through the defined movement region,
wherein the failsafe evaluation unit is configured to determine, from the motion value, the number of passes of the moving machine part through the defined movement region and a first and a second moving direction of the moving machine part, in a failsafe manner.

2. The device as claimed in claim 1, further comprising a counter, in which the number of passes is storable,
wherein the counter is increased by a first defined absolute value when the moving machine part has completely passed through the defined movement region in a first moving direction and is reduced by a second defined absolute value when the moving machine part has completely passed through the defined movement region in a second moving direction.

3. The device as claimed in claim 1, further comprising a memory, in which a value, which represents a boundary of the defined movement region, is storable.

4. The device as claimed in claim 1, wherein the failsafe evaluation unit is configured to provide an output signal, which represents the first or second moving direction.

5. The device as claimed in claim 1, wherein the failsafe evaluation unit is configured to provide a warning signal if the number of passes of the moving machine part through the defined movement region exceeds a defined value.

6. The device as claimed in claim 1, wherein the failsafe evaluation unit is configured to provide the shutdown signal upon exceeding a first defined value of the motion value.

7. The device as claimed in claim 1, wherein the failsafe evaluation unit is configured to provide a release signal if the motion value falls below a second defined value or represents a stop.

8. The device as claimed in claim 1, further comprising a failsafe signal encoder for providing the encoder signal having a first and a second measurement channel.

9. The device as claimed in claim 8, wherein the failsafe signal encoder is a rotary encoder having either one of an optical or a magnetic sampling unit attached to a driving shaft.

10. The device as claimed in claim 1, wherein the failsafe evaluation unit is a two-channel, redundant evaluation unit.

11. The device as claimed in claim 1, wherein the failsafe evaluation unit comprises a first and a second processing unit, each configured to generate an output signal, which represents the shutdown signal,
wherein the first and the second processing units are configured to mutually monitor one another.

12. The device of claim 1, wherein the failsafe evaluation unit is further configured to establish the defined movement region based upon the motion value and at least one additional factor associated with said moving machine part which, in combination with said motion value, establishes the boundaries of the defined movement region.

13. The device as claimed in claim 1, further comprising a first and a second switching element and the shutdown signal is provided as a function of the switch position of the first and second switching elements.

14. A method of operating a safety system including a failsafe evaluation unit for failsafely monitoring a number of passes of a moving machine part through a defined movement region, the method comprising:
- receiving an encoder signal at an input of the failsafe evaluation unit, which represents a motion value of the moving machine part,
- configuring the failsafe evaluation unit to determine, from the motion value, the number of passes of the moving machine part through the defined movement region and a first and a second moving direction of the moving machine part, in a failsafe manner, and
- further configuring the failsafe evaluation unit to provide a failsafe shutdown signal as a function of the number of passes of the moving machine part through the defined movement region.

15. The method of claim 14, including the further step of establishing the defined movement region based upon the motion value and at least one additional factor associated with said moving machine part which, in combination with said motion value, establishes the boundaries of the defined movement region.

16. A non-transitory computer readable storage medium containing a computer program having a program code which when executed on a processor of an evaluation unit in a safety system for failsafely monitoring a number of passes of a moving machine part through a defined movement region, causes the processor to perform the steps of:
- processing an encoder signal received at an input of the failsafe evaluation unit, which represents a motion value of the moving machine part,
- determining, from the motion value, the number of passes of the moving machine part through the defined movement region and a first and a second moving direction of the moving machine part, and
- providing a failsafe shutdown signal as a function of the number of passes of the moving machine part through the defined movement region.

17. The non-transitory computer readable storage medium of claim 16, including the further step of establishing the defined movement region based upon the motion value and at least one additional factor associated with said moving machine part which, in combination with said motion value, establishes the boundaries of the defined movement region.

18. A device for failsafe monitoring a number of passes of a moving machine part through a defined movement region, comprising:
- an input for receiving an encoder signal, which represents a motion value of the moving machine part,
- a failsafe evaluation unit for providing a failsafe shutdown signal as a function of the number of passes of the moving machine part through the defined movement region, and
- a memory, in which a predefined value, which represents a boundary of the defined movement region, is stored,
- wherein the failsafe evaluation unit is configured to determine, from the motion value and the predefined value, the number of passes of the moving machine part through the defined movement region.

19. A device for failsafe monitoring a number of passes of a moving machine part through a defined movement region, comprising:
- an input for receiving an encoder signal, which represents a motion value of the moving machine part, and
- a failsafe evaluation unit for providing a failsafe shutdown signal as a function of the number of passes of the moving machine part through the defined movement region,
- wherein the failsafe evaluation unit is configured to:
- determine, from the motion value, the number of passes of the moving machine part through the defined movement region, and
- provide a further signal, the further signal being at least one of a warning signal if the number of passes of the moving machine part through the defined movement region exceeds a defined value and a release signal if the motion value falls below a second defined value or represents a stop.

20. A device for failsafe monitoring a number of passes of a moving machine part through a defined movement region, comprising:
- an input for receiving an encoder signal, which represents a motion value of the moving machine part, and
- a failsafe evaluation unit for providing a failsafe shutdown signal as a function of the number of passes of the moving machine part through the defined movement region,
- wherein the failsafe evaluation unit is configured to:
- determine, from the motion value, the number of passes of the moving machine part through the defined movement region, and
- establish the defined movement region based upon the motion value and at least one additional factor associated with said moving machine part which, in combination with said motion value, establishes the boundaries of the defined movement region.

* * * * *